US011945340B2

(12) United States Patent
Jeong et al.

(10) Patent No.: US 11,945,340 B2
(45) Date of Patent: Apr. 2, 2024

(54) VEHICLE DRIVER'S SEAT STRUCTURE

(71) Applicants: Hyundai Motor Company, Seoul (KR); Kia Corporation, Seoul (KR)

(72) Inventors: Seung Min Jeong, Hwaseong-si (KR); Seung Ho Noh, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/895,151

(22) Filed: Aug. 25, 2022

(65) Prior Publication Data
US 2023/0264607 A1  Aug. 24, 2023

(30) Foreign Application Priority Data
Feb. 21, 2022 (KR) .................. 10-2022-0022200

(51) Int. Cl.
| | |
|---|---|
| *B60N 2/015* | (2006.01) |
| *B60N 2/90* | (2018.01) |
| *B60N 3/06* | (2006.01) |
| *B62D 25/20* | (2006.01) |

(52) U.S. Cl.
CPC .............. *B60N 2/015* (2013.01); *B60N 2/90* (2018.02); *B60N 2/995* (2018.02); *B60N 3/06* (2013.01); *B62D 25/2018* (2013.01)

(58) Field of Classification Search
CPC .......... B60N 2/015; B60N 2/90; B60N 2/995; B60N 3/06; B62D 25/2018
USPC ................................. 296/63, 193.07, 65.03
See application file for complete search history.

(56) References Cited

U.S. PATENT DOCUMENTS

| | | | | |
|---|---|---|---|---|
| 4,014,587 | A * | 3/1977 | Eggert, Jr. ............. | B62D 25/20 296/204 |
| 8,616,619 | B2 * | 12/2013 | Kimura .................. | B60H 1/244 454/142 |
| 8,944,493 | B2 * | 2/2015 | Kimura .................. | B62D 33/06 296/190.09 |
| 2002/0093215 | A1 * | 7/2002 | Gaus ...................... | B60N 2/995 296/75 |
| 2004/0155488 | A1 * | 8/2004 | Saito .................. | B62D 25/2018 296/204 |
| 2004/0227379 | A1 | 11/2004 | Yamamura et al. | |
| 2008/0047771 | A1 * | 2/2008 | Ujimoto ............... | B62D 25/025 180/326 |
| 2013/0320713 | A1 * | 12/2013 | Iwamoto ................ | B60N 2/015 296/193.07 |

(Continued)

FOREIGN PATENT DOCUMENTS

| | | |
|---|---|---|
| DE | 102020125494 A1 * | 3/2022 |
| JP | S6350780 U | 4/1988 |

(Continued)

*Primary Examiner* — Amy R Weisberg
*Assistant Examiner* — Melissa Ann Bonifazi
(74) *Attorney, Agent, or Firm* — Slater Matsil, LLP

(57) ABSTRACT

An embodiment vehicle driver's seat structure includes a dashboard floor panel combined with a front of a center floor panel and having a shape extending in an upward inclined direction, a lower seat support installed on a top surface of the center floor panel and extending along a vehicle front-rear direction, an upper seat support installed on top of the lower seat support and underneath a driver's seat to support the driver's seat, and an upper floor horizontally connecting the upper seat support and the dashboard floor panel to each other.

20 Claims, 8 Drawing Sheets

(56) References Cited

U.S. PATENT DOCUMENTS

| | | | |
|---|---|---|---|
| 2021/0300481 A1* | 9/2021 | Jeong | B62D 25/04 |
| 2021/0331749 A1 | 10/2021 | Hwang et al. | |
| 2021/0402903 A1* | 12/2021 | Di Censo | B60N 2/995 |
| 2023/0099512 A1* | 3/2023 | Harmon | B60T 7/04 |
| | | | 296/75 |

FOREIGN PATENT DOCUMENTS

| | | | |
|---|---|---|---|
| JP | 2004067077 A | | 3/2004 |
| JP | 2011073580 A | | 4/2011 |
| KR | 20210130883 A | | 11/2021 |
| KR | 200495004 Y1 | * | 2/2022 |

* cited by examiner

VEHICLE DRIVER'S SEAT STRUCTURE

CROSS-REFERENCE TO RELATED APPLICATIONS

This application claims the benefit of Korean Patent Application No. 10-2022-0022200, filed on Feb. 21, 2022, which application is hereby incorporated herein by reference.

TECHNICAL FIELD

The present disclosure relates to a vehicle structure.

BACKGROUND

For purpose-built vehicles (PBVs), there are two types of modules: a life module and a drive module. The life module serves to form various types of occupant and baggage spaces in response to market demands. The drive module is associated with substantial vehicle traveling. The life module for meeting various market demands is configured to be combined with a predetermined drive module. Accordingly, production of various types of vehicles can be facilitated, and thus a more effective response can be made to a market trend toward diversified small-quantity production.

Among the PBVs, in an electric vehicle-based PBV for maximizing the size of space inside an electric vehicle, a driver's seat is arranged as close as possible to the electric-vehicle front. Thus, desirably, utilization efficiency of the occupant and baggage spaces in the rear portion of the electric vehicle can be improved.

The foregoing is intended merely to aid in the understanding of the background of the present disclosure, and is not intended to mean that the present disclosure falls within the purview of the related art that is already known to a person of ordinary skill in the art.

SUMMARY

An embodiment of the present disclosure provides a vehicle driver's seat structure capable of arranging a driver's seat as close as possible to the vehicle front. With this vehicle driver's seat structure, not only can utilization efficiency of a vehicle occupant space be maximized, but also a driver's seat can be stabilized in a securely supported state. Furthermore, a space where a driver comfortably puts his/her feet, the stability against a frontside collision of a vehicle, and the durability of the driver's seat can be secured, and vibration and noise can be reduced. Consequently, the vehicle marketability can be improved.

According to one embodiment of the present disclosure, there is provided a vehicle driver's seat structure that includes a dashboard floor panel combined with the front of a center floor panel in such a manner as to have a shape extending in an upward inclined way, a lower seat support installed on the top of the center floor panel in a manner that extends over a long distance along a vehicle front-rear direction, an upper seat support installed on the top of the lower seat support, but underneath a driver's seat for support thereof, and an upper floor horizontally connecting the upper seat support and the dashboard floor panel to each other.

A plurality of the lower seat supports may be arranged in parallel along a vehicle transverse direction, and a vehicle frame cross member may be arranged underneath the center floor panel in a manner that extends over a long distance along the vehicle transverse direction, so that the vehicle frame cross member overlaps the plurality of the lower seat supports with the center floor panel in between.

The plurality of the lower seat supports may be configured to have a hexagonal shape in such a manner that lower surfaces thereof are sealed by the center floor panel.

A plurality of the vehicle frame cross members, including the vehicle frame cross members overlapping the vehicle front sides of the plurality of the lower seat supports and the vehicle rear sides thereof, may be provided.

The upper seat support may be formed in a rectangular box-like shape.

The upper seat support in the rectangular box-like shape may have an opening hole at one surface thereof.

A plurality of the lower seat supports may be arranged in parallel along a vehicle transverse direction, and a plurality of the upper seat supports may be formed to extend over a long distance along the vehicle transverse direction and to connect the plurality of the lower seat supports to each other and may be installed in such a manner as to be spaced apart in parallel with each other along the vehicle front-rear direction.

A dashboard cross member may be provided on an upper lateral surface of the dashboard floor panel in a manner that extends over a long distance along a vehicle transverse direction, and the upper floor may be installed in such a manner as to connect the dashboard cross member and the front of the upper seat support to each other.

Front brackets that are supported on an upper surface of the dashboard cross member and support a lower surface of the upper floor may be provided on the front of the upper floor, and rear brackets combined with the front of the upper seat support may be provided on the rear of the upper floor in such a manner as to support the lower surface of the upper floor.

Floor longitudinal members may be integrally combined with lower surfaces, respectively, of opposite lateral end portions of the upper floor in a manner that extends over a long distance along the vehicle front-rear direction, front end portions of the floor longitudinal members may be combined with the front brackets, respectively, in such a manner as to be supported thereon, and rear end portions of the floor longitudinal members may be combined with the rear brackets, respectively, in such a manner as to be supported thereon.

The upper floor may be combined with the front brackets and the rear brackets using respective fastening bolts.

The floor longitudinal members, each having an inverted U-shaped cross section, may be combined with the lower surface of the upper floor, and the fastening bolts sequentially may pass through the upper floor and each of the floor longitudinal members and then may be fastened to the front brackets or the rear brackets.

The floor longitudinal members, each having a U-shaped cross section, may be combined with the lower surface of the upper floor, a through-hole through which the fastening bolt passes may be formed in the upper floor, and the fastening bolts, after heads thereof pass through the through-hole, may be fastened in such a manner that the floor longitudinal member is fixed to the front brackets or the rear brackets.

According to embodiments of the present disclosure, a driver's seat is arranged as close as possible to the vehicle front. Thus, not only can utilization efficiency of a vehicle occupant space be maximized, but also the driver's seat can be stabilized in a securely supported state. Furthermore, a space where a driver comfortably puts his/her feet, the stability against a frontside collision of a vehicle, and the durability of the driver's seat can be secured, and vibration and noise can be reduced. Consequently, the vehicle marketability can be improved.

BRIEF DESCRIPTION OF THE DRAWINGS

The above and other objects, features and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Figure 1:
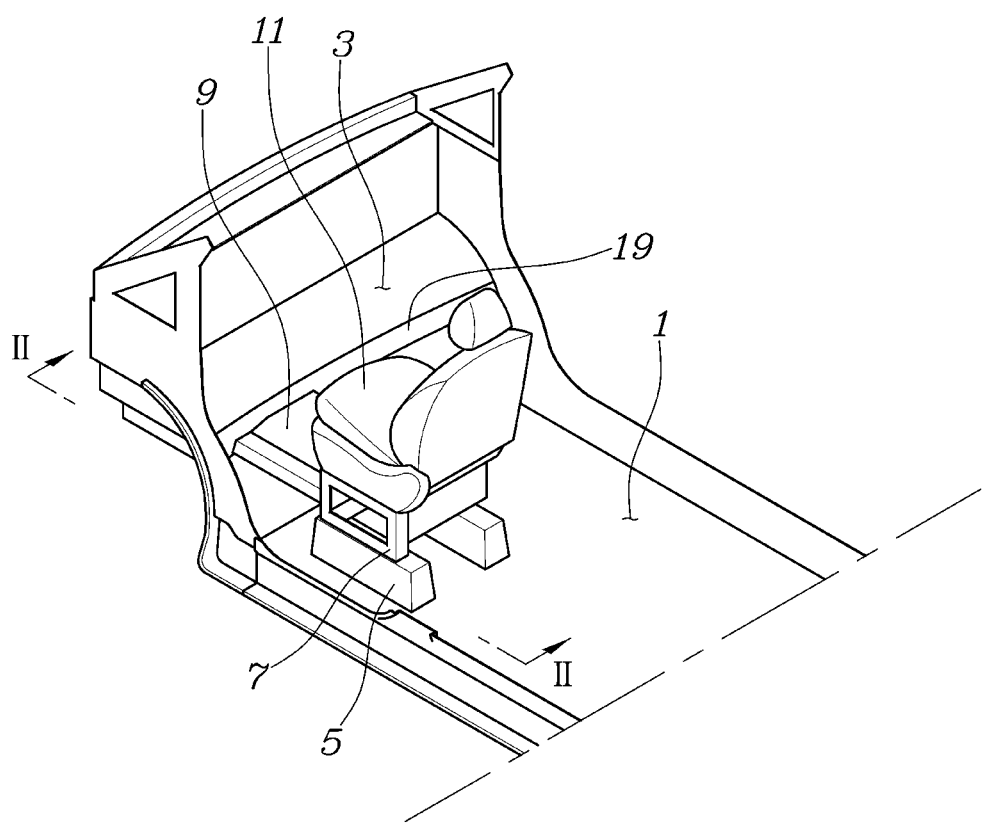
FIG. 1 is a view illustrating a vehicle driver's seat structure according to embodiments of the present disclosure.

Embodiments of the present disclosure will be described in terms of specific structures and functions to enable a person of ordinary skill in the art to comprehend the present disclosure. The embodiments of the present disclosure may be practiced in various ways, and the present disclosure should not be construed as being limited thereto.

Various modifications may be made in various ways to the embodiments of the present disclosure. Therefore, specific embodiments will be described in detail below with reference to the accompanying drawings. However, such specific embodiments are not intended to impose any limitation on the technical idea of the present disclosure. All alterations, equivalents, and substitutes that are included within the technical idea of the present disclosure should be understood as falling within the scope of the present disclosure.

The terms first, second, and so on may be used to describe various constituent elements but should not limit the meanings of these constituent elements. These terms are only used to distinguish one constituent element from another. For example, a first constituent element may be termed a second constituent element without departing from the scope of the present disclosure. Likewise, the second constituent element may also be termed the first constituent element.

It should be understood that a constituent element, when referred to as being "coupled to" or "connected to" a different constituent element, may be directly coupled to or directly connected to the different constituent element or may be coupled to or connected to the different constituent element with a third constituent element in between. In contrast, it should be understood that a constituent element, when referred to as being "directly coupled to" or "directly connected to" a different constituent element, is coupled to or connected to the different constituent element without a third constituent element in between. The same is true for terms referring to a relationship between constituent elements. For example, the terms "between" and "directly between" and the terms "adjacent to" and "directly adjacent to" should also be construed in the same manner.

The terms used throughout the present specification are only for describing a specific embodiment and are not intended to impose any limitation on the present disclosure. A noun in singular form has the same meaning as when used in plural form, unless it has a different meaning in context. It should be understood that, throughout the present specification, the term "include," "have," or the like is intended to indicate that a feature, a number, a step, an operation, a constituent element, a component, or a combination thereof is present, without precluding the possibility that one or more other features, numbers, steps, operations, constituent elements, components or a combination thereof will be present or added.

Unless otherwise defined, each of all the terms used throughout the present specification, including technical or scientific terms, has the same meaning as is normally understood by a person of ordinary skill in the art to which the present disclosure pertains. The term as defined in commonly used dictionaries should be construed as having the same contextual meaning as that used in the relevant field of technology and, unless otherwise explicitly defined in the present specification, should not be construed as having an excessively implied meaning or a purely literal meaning.

Exemplary embodiments of the present disclosure will be described in detail below with reference to the accompanying drawings. The same reference numerals on the drawings refer to the same constituent element.

Figure 2:
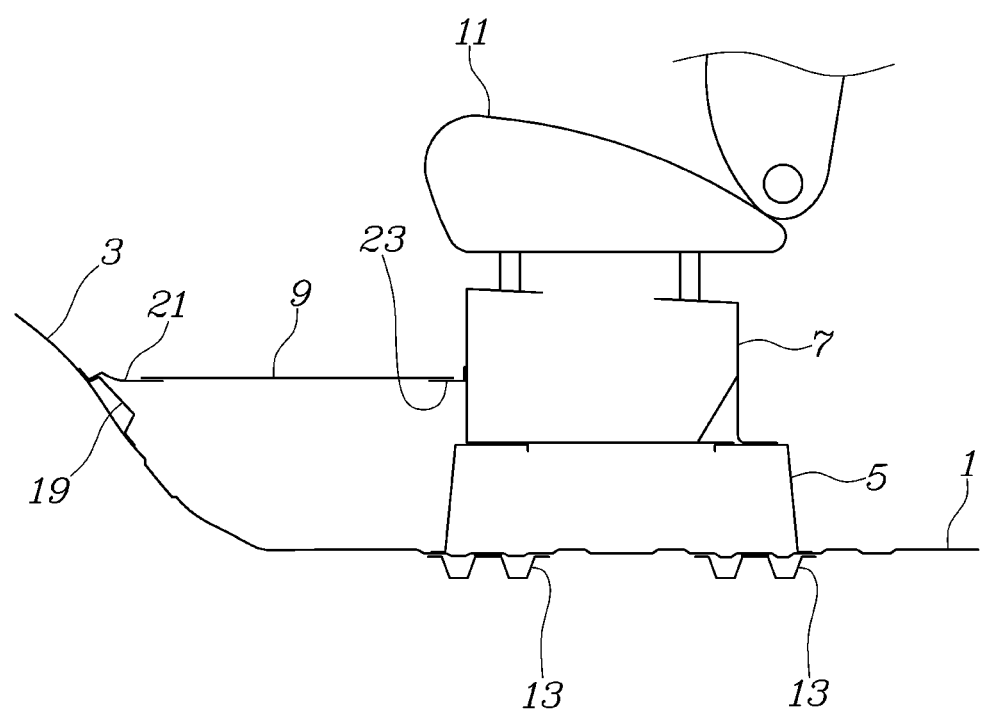
FIG. 2 is a cross-sectional view taken along line II-II on FIG. 1.

With reference to FIGS. 1 and 2, a vehicle driver's seat structure according to an embodiment of the present disclosure is configured to include a dashboard floor panel 3 combined with the front of a center floor panel 1 in such a manner as to have a shape extending in an upward inclined way, a lower seat support 5 installed on the top of the center floor panel 1 in a manner that extends over a long distance along a vehicle front-rear direction, an upper seat support 7 installed on the top of the lower seat support 5, but underneath a driver's seat for support thereof, and an upper floor 9 horizontally connecting the upper seat support 7 and the dashboard floor panel 3 to each other.

That is, the lower seat support 5, the upper seat support 7, and a driver's seat 11 are installed in this order on top of each other on the top of the center floor panel 1. Then, the upper floor 9 horizontally connects the upper seat support 7 and the dashboard floor panel 3 to each other. With this configuration, a driver sitting on the driver's seat 11 can comfortably put his/her feet on the top of the upper floor 9.

For reference, the dashboard floor panel 3 is installed in such a manner as to have a shape extending upward from the center floor panel 1. Thus, a space in which a motor for generating a vehicle motive power, a power electronics (PE) component, and the like are to be installed is formed under the dashboard floor panel 3.

Therefore, in a case where the driver's seat 11 is arranged close to the vehicle front in order to secure a vehicle occupant space, the dashboard floor panel 3, extending upward as described above, makes it difficult to secure a space in which the driver puts his/her feet.

For this reason, according to embodiments of the present disclosure, as described above, in a state where the lower seat support 5 and the upper seat support 7 are stacked in this order on top of each other on the top of the center floor panel 1, the driver's seat 11 is installed on the upper seat support 7. Then, as described above, the upper floor 9 is horizontally installed between the dashboard floor panel 3 and the upper seat support 7. Thus, the driver's seat 11 can be arranged in such a manner as to be close to the vehicle front, and, at the same time, the space in which the driver comfortably puts his/her feet can be secured.

In addition, a foam, a carpet, or the like is arranged on an upper surface of the upper floor 9. Thus, the driver can place his/her feet in a more comfortable way.

A plurality of the lower seat supports 5 are arranged in parallel along a vehicle transverse direction. A vehicle frame cross member 13 is arranged underneath the center floor panel 1 in a manner that extends over a long distance along a vehicle transverse direction, so that the vehicle frame cross member 13 overlaps the lower seat support 5 with the center floor panel 1 in between.

That is, the vehicle frame cross member 13 is installed underneath the center floor panel 1 on which the plurality of the lower seat supports 5 are mounted, and thus the plurality of the lower seat supports 5 can be fixed more securely.

A plurality of the vehicle frame cross members 13, including the vehicle frame cross members that overlap the vehicle front sides of the plurality of the lower seat supports 5 and the vehicle rear sides thereof, may be provided.

For reference, both end portions of the vehicle frame cross member 13 are connected to opposite vehicle side seals, respectively.

The plurality of the lower seat supports 5 may be configured to have a hexahedral shape in such a manner that lower surfaces thereof are sealed by the center floor panel 1, and thus can be installed in such a manner as to possess high strength by themselves.

According to the present embodiment, a flange is provided to a lower end portion of each of the plurality of the lower seat supports 5, and the flange is combined, by welding or the like, with the top of the center floor panel 1.

Figure 3:
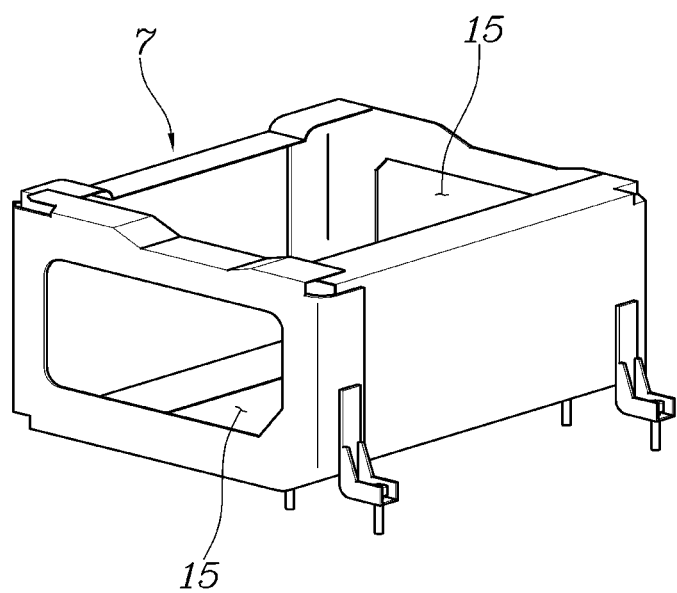
FIG. 3 is a view illustrating an upper seat support in FIG. 1.

The upper seat support 7 may be formed in a rectangular box-like shape as illustrated in FIG. 3.

According to the present embodiment, the upper seat support 7, as illustrated, is configured to have the rectangular box-like shape that has an opening hole 15 at one surface thereof. Thus, the weight of the upper seat support 7 and the manufacturing cost thereof can be reduced. Furthermore, the sufficient strength of the upper seat support 7 can be secured.

Figure 4:
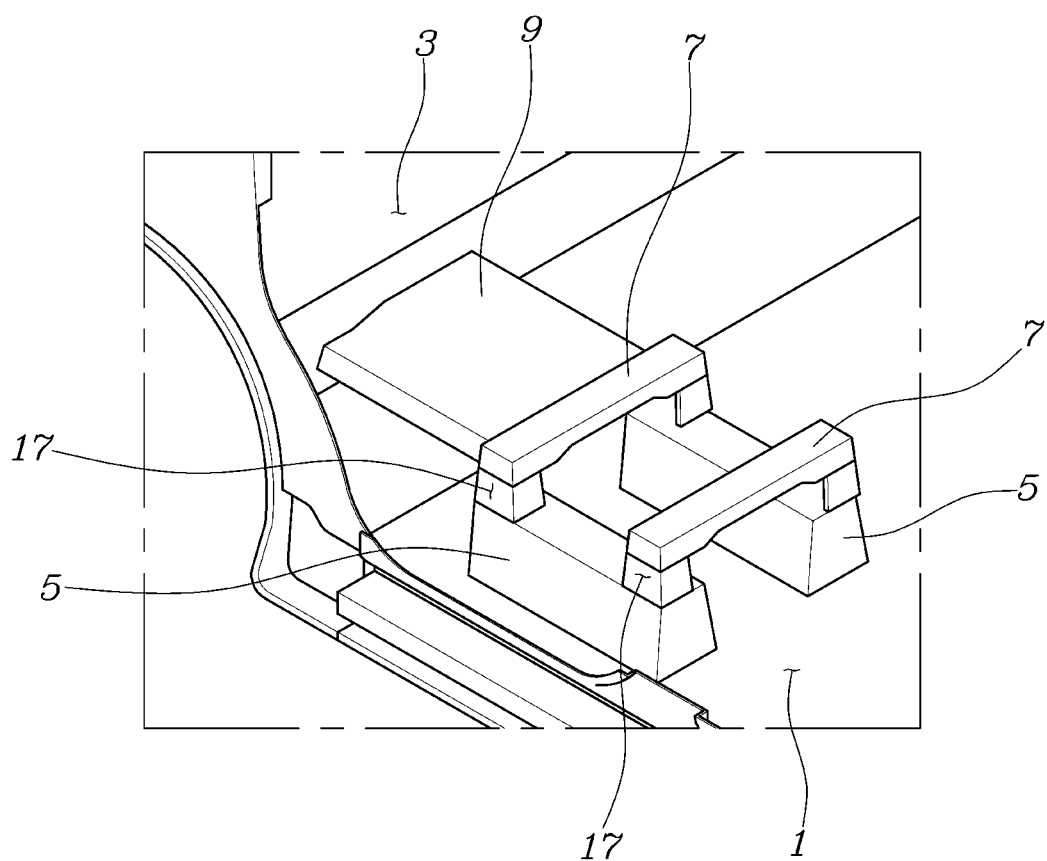
FIG. 4 is a view illustrating another example of the upper seat support.

As illustrated in FIG. 4, a plurality of the upper seat supports 7 may be formed to extend over a long distance along the vehicle transverse direction and to connect the plurality of the lower seat supports 5 to each other and may be installed in such a manner as to be spaced apart in parallel with each other along the vehicle front-rear direction.

For reference, in FIG. 4, the plurality of the upper seat supports 7 are installed using respective mounting brackets 17 combined with the tops of the plurality of the lower seat supports 5.

A dashboard cross member 19 is provided on an upper lateral surface of the dashboard floor panel 3 in a manner that extends over a long distance along the vehicle transverse direction. The upper floor 9 is installed in such a manner as to connect the dashboard cross member 19 and the front of the upper seat support 7 to each other.

Figure 5:
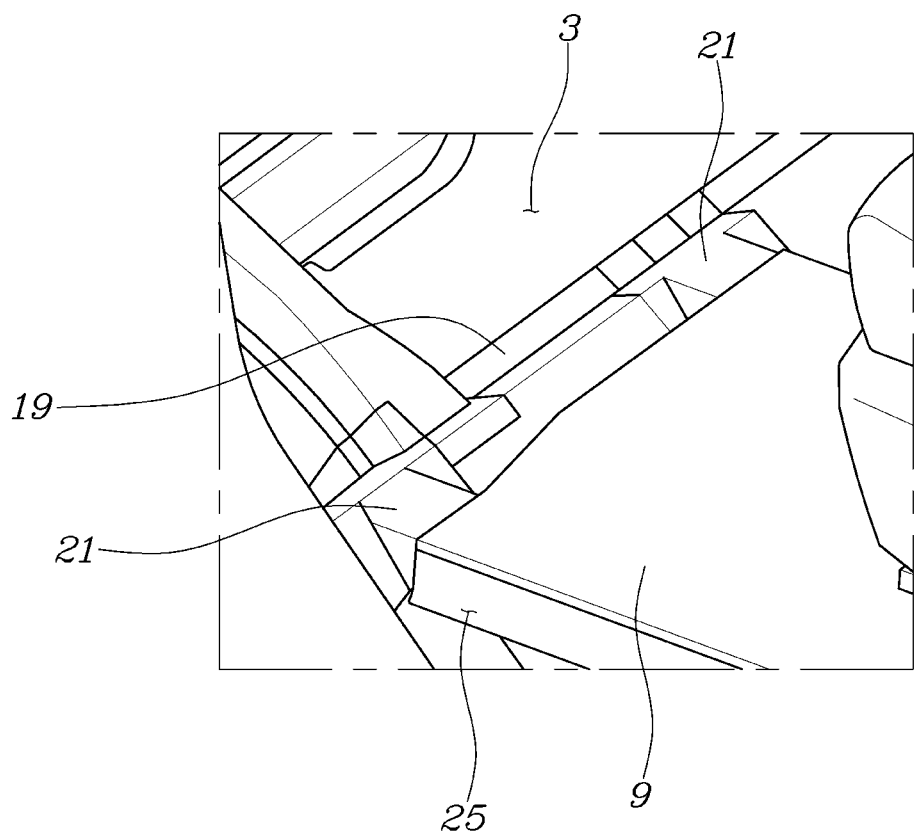
FIG. 5 is a view illustrating a state where an upper floor in FIG. 1 is supported on front brackets.
Figure 6:
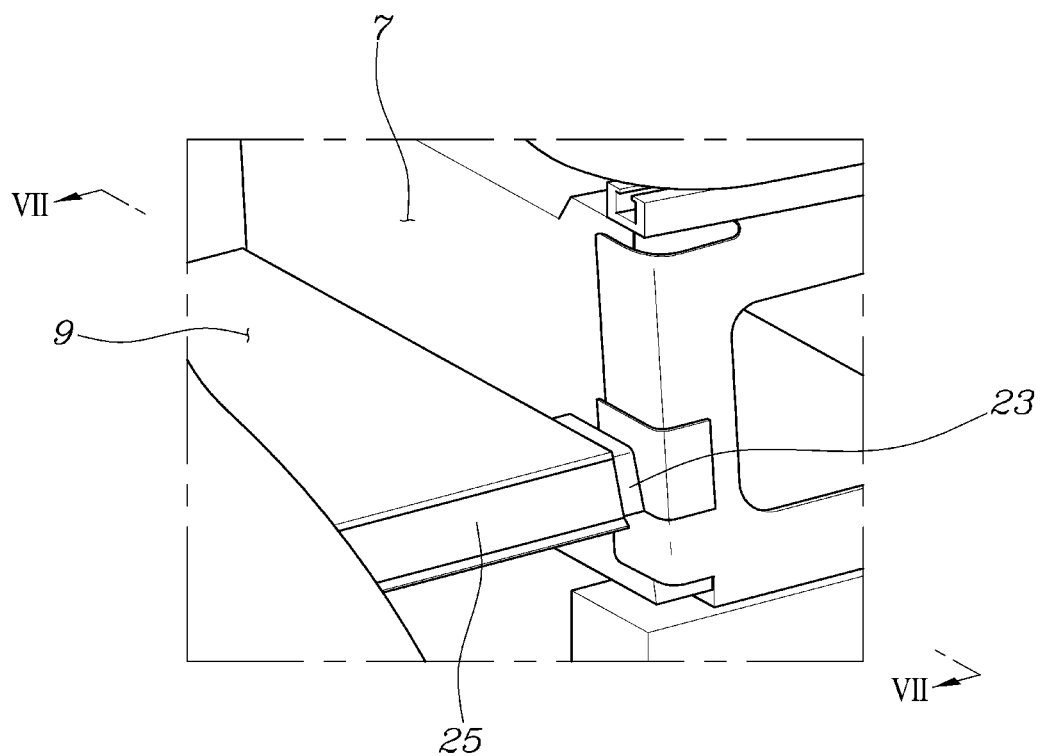
FIG. 6 is a view illustrating a state where the upper floor in FIG. 1 is supported on rear brackets.

As illustrated in FIGS. 5 and 6, front brackets 21 that are supported on an upper surface of the dashboard cross member 19 and support a lower surface of the upper floor 9 are provided on the front of the upper floor 9. Rear brackets 23 combined with the front of the upper seat support 7 are provided on the rear of the upper floor 9 in such a manner as to support the lower surface of the upper floor 9.

In addition, floor longitudinal members 25 are integrally combined with lower surfaces, respectively, of opposite lateral end portions of the upper floor 9 in such a manner as to extend over a long distance along the vehicle front-rear direction. Front end portions of the floor longitudinal members 25 are combined with the front brackets 21, respectively, in such a manner as to be supported thereon. Rear end portions of the floor longitudinal members 25 are combined with the rear brackets 23, respectively, in such a manner as to be supported thereon.

That is, the front and rear of the upper floor 9 are fixed to the front brackets 21 and the rear brackets 23, respectively, in a state where the upper floor 9 is combined with the tops of the two floor longitudinal members 25 that are installed in parallel.

Figure 7:
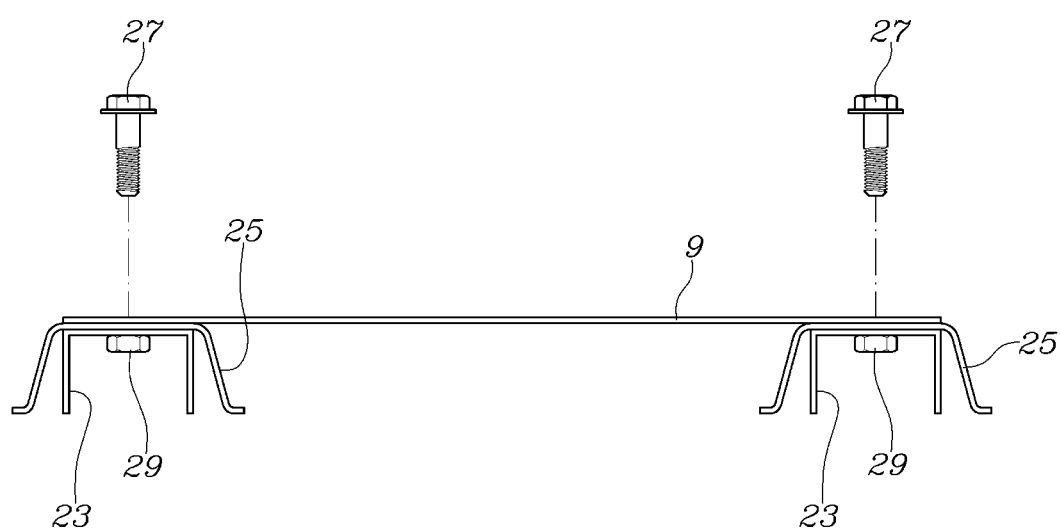
FIG. 7 is a cross-sectional view taken along line VII-VII on FIG. 6.

At this point, it is desirable that the upper floor 9, as illustrated in FIG. 7, is combined with the front brackets 21 and the rear brackets 23, using respective fastening bolts 27. Thus, disassembly and assembly can be facilitated, thereby ensuring the ease of performing maintenance.

At this point, the floor longitudinal members 25, each having an inverted U-shaped cross section, are combined with the lower surface of the upper floor 9. The fastening bolts 27 sequentially pass through the upper floor 9 and each of the floor longitudinal member 25 and then are fastened to the front brackets 21 or the rear brackets 23. As illustrated in FIG. 7, a weld nut 29 with which the fastening bolt 27 is combined may be provided to each of the front brackets 21 and each of the rear brackets 23.

Figure 8:
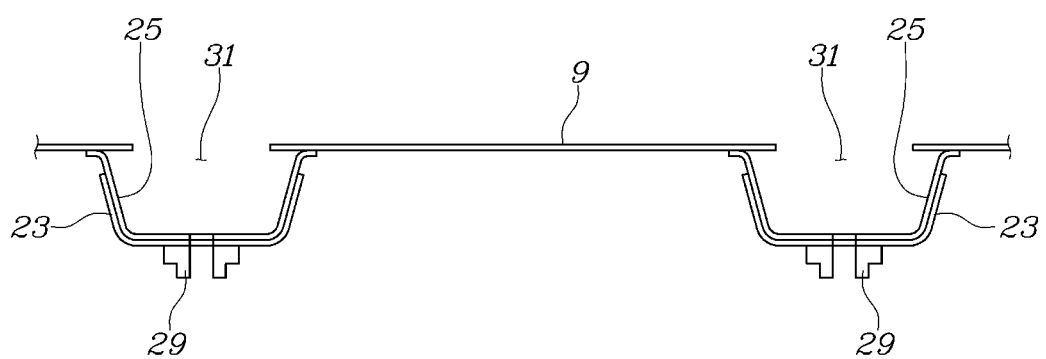
FIG. 8 is a view illustrating a combination of floor longitudinal members with the upper floor that is different from that illustrated in FIG. 7.

As illustrated in FIG. 8, the floor longitudinal members 25, each having a U-shaped cross section, may be combined with the lower surface of the upper floor 9. Thus, each of the floor longitudinal members 25 and the upper floor 9, when combined with each other, may have a rhombus-shaped cross section. A through-hole 31 through which the fastening bolt 27 passes may be formed in the upper floor 9.

In this case, the fastening bolts 27, after heads thereof pass through the through-hole 31, are fastened in such a manner that the floor longitudinal member 25 is fixed to the front brackets 21 or the rear brackets 23.

As described above, according to embodiments of the present disclosure, a structure where the upper floor 9, which is reinforced with the floor longitudinal members 25, connects the dashboard floor panel 3 and the upper seat support 7 to each other is employed. Thus, a securely mounted state of the driver's seat 11 can be continuously maintained in a stable manner. In the event of a vehicle front-end collision or the like, the effect in which an impact force applied from the dashboard floor panel 3 side is distributed through the floor longitudinal members 25 toward the vehicle rear can be achieved.

The specific embodiments of the present disclosure are described above with reference to the accompanying drawings, but it would be obvious to a person of ordinary skill in the art that various modifications and alterations are possibly made to the present disclosure without departing from the technical idea of the present disclosure that is claimed in the following claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A vehicle driver's seat structure comprising:
   a dashboard floor panel combined with a front of a center floor panel and having a shape extending in an upward inclined direction;
   a plurality of lower seat supports installed on a top surface of the center floor panel and extending along a vehicle front-rear direction, the lower seat supports arranged in parallel along a vehicle transverse direction;
   an upper seat support installed on top of a lower seat support of the plurality of lower seat supports and underneath a driver's seat to support the driver's seat;
   an upper floor horizontally connecting the upper seat support and the dashboard floor panel to each other;
   a vehicle frame cross member arranged underneath the center floor panel and extending along the vehicle transverse direction, wherein the vehicle frame cross member overlaps the plurality of the lower seat supports with the center floor panel in between.

2. The vehicle driver's seat structure of claim 1, wherein the lower seat supports have a hexagonal shape and lower surfaces thereof are sealed by the center floor panel.

3. The vehicle driver's seat structure of claim 1, further comprising a plurality of the vehicle frame cross members, wherein some of the vehicle frame cross members overlap vehicle front sides of the lower seat supports and others of the vehicle frame cross members overlap vehicle rear sides of the lower seat supports.

4. The vehicle driver's seat structure of claim 1, wherein the upper seat support has a rectangular box-like shape.

5. The vehicle driver's seat structure of claim 4, wherein the upper seat support comprises an opening hole at one surface thereof.

6. The vehicle driver's seat structure of claim 1, further comprising a plurality of the upper seat supports that extend along the vehicle transverse direction and connect the plurality of the lower seat supports to each other, wherein the upper seat supports are spaced apart in parallel with each other along the vehicle front-rear direction.

7. The vehicle driver's seat structure of claim 1, wherein the lower seat supports have a hexagonal shape.

8. The vehicle driver's seat structure of claim 1, further comprising a plurality of the upper seat supports that extend along the vehicle transverse direction.

9. The vehicle driver's seat structure of claim 8, wherein the upper seat supports each have a rectangular box-like shape.

10. A vehicle driver's seat structure comprising:
    a dashboard floor panel combined with a front of a center floor panel and having a shape extending in an upward inclined direction;
    a lower seat support installed on a top surface of the center floor panel and extending along a vehicle front-rear direction;
    an upper seat support installed on top of the lower seat support and underneath a driver's seat to support the driver's seat;
    a dashboard cross member provided on an upper lateral surface of the dashboard floor panel and extending along a vehicle transverse direction;
    an upper floor horizontally connecting the upper seat support and the dashboard floor panel to each other and connecting the dashboard cross member and a front of the upper seat support to each other;
    front brackets provided on the front of the upper floor, the front brackets being supported on an upper surface of the dashboard cross member and supporting a lower surface of the upper floor; and
    rear brackets provided on a rear of the upper floor and combined with the front of the upper seat support to support the lower surface of the upper floor.

11. The vehicle driver's seat structure of claim 10, wherein:
    floor longitudinal members are integrally combined with lower surfaces, respectively, of opposite lateral end portions of the upper floor and extending along the vehicle front-rear direction;
    front end portions of the floor longitudinal members are combined with the front brackets, respectively, and are supported thereon; and
    rear end portions of the floor longitudinal members are combined with the rear brackets, respectively, and are supported thereon.

12. The vehicle driver's seat structure of claim 11, wherein the upper floor is combined with the front brackets and the rear brackets using respective fastening bolts.

13. The vehicle driver's seat structure of claim 12, wherein the floor longitudinal members, each having an inverted U-shaped cross section, are combined with the lower surface of the upper floor, and the fastening bolts sequentially pass through the upper floor and each of the floor longitudinal members and then are fastened to the front brackets or the rear brackets.

14. The vehicle driver's seat structure of claim 12, wherein the floor longitudinal members, each having a U-shaped cross section, is combined with the lower surface of the upper floor, through-holes through which the fastening bolts pass through are formed in the upper floor, and the fastening bolts, after heads thereof pass through the through-holes, are fastened such that the floor longitudinal members are fixed to the front brackets or the rear brackets.

15. A vehicle comprising:
    a vehicle body comprising a center floor panel;
    a vehicle seat installed in a front region of an interior of the vehicle;
    a dashboard floor panel combined with a front of the center floor panel, the dashboard floor panel extending in an upward inclined direction;
    lower seat supports installed on a top surface of the center floor panel and extending along a vehicle front-rear direction, wherein the lower seat supports are arranged in parallel along a vehicle transverse direction;
    upper seat supports installed on top of the lower seat supports and underneath the vehicle seat to support the vehicle seat, wherein the upper seat supports extend along the vehicle transverse direction and connect the lower seat supports to each other; and
    an upper floor horizontally connecting the upper seat supports and the dashboard floor panel to each other, wherein the upper seat supports are spaced apart in parallel with each other along the vehicle front-rear direction.

16. The vehicle of claim 15, further comprising a vehicle frame cross member arranged underneath the center floor panel and extending along a vehicle transverse direction, wherein the vehicle frame cross member overlaps the lower seat supports with the center floor panel in between.

17. The vehicle of claim 16, wherein the lower seat supports have a hexagonal shape and lower surfaces thereof are sealed by the center floor panel.

18. The vehicle of claim 16, further comprising a plurality of the vehicle frame cross members, wherein some of the vehicle frame cross members overlap vehicle front sides of the lower seat supports and others of the vehicle frame cross members overlap vehicle rear sides of the lower seat supports.

19. The vehicle of claim 15, wherein the upper seat supports have a rectangular box-like shape.

20. The vehicle of claim 19, wherein the upper seat supports each comprise an opening hole at one surface thereof.

* * * * *